Feb. 23, 1971  J. KIWALLE  3,564,703
METHOD OF ALIGNING FRICTION WELDED PARTS
Filed Nov. 20, 1968  2 Sheets-Sheet 1

INVENTOR
JOZEF KIWALLE

BY
Fryer, Tjensvold, Feix, Phillips & Lempio
ATTORNEYS

United States Patent Office 3,564,703
Patented Feb. 23, 1971

3,564,703
METHOD OF ALIGNING FRICTION WELDED PARTS
Jozef Kiwalle, Peoria, Ill., assignor to Caterpillar Tractor Co., Peoria, Ill., a corporation of California
Filed Nov. 20, 1968, Ser. No. 777,289
Int. Cl. B23k 27/00
U.S. Cl. 29—470.3                                      6 Claims

ABSTRACT OF THE DISCLOSURE

A friction welding process is accurately controlled to provide for the welding of workpieces in a manner such that the joined workpieces are oriented in precise angular alignment with respect to each other.

BACKGROUND OF THE INVENTION

This invention relates to friction welding of the general type wherein two workpieces are subjected to relative rotation while in rubbing contact with each other to generate frictional heat to raise the workpieces to a suitable welding temperature, whereupon the relative rotation subsides and a bond is formed between the workpieces. The invention is particularly directed to the friction welding of two workpieces whereby the joined workpieces will be oriented in precise angular alignment with respect to each other.

Many parts, because of their configuration or intended application, require precise angular alignment when finish welded. Oftentimes manufacturers are forced to use less efficient and more costly techniques for welding or otherwise joining such parts since angular alignment is largely uncontrollable in prior art friction welding methods and apparatus.

Accordingly, it is the principal object of the present invention to provide a method and apparatus for friction welding two workpieces wherein the welding process is accurately controlled and relative rotation between the workpieces is stopped at a predetermined location to provide precise angular alignment between the joined workpieces.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without department from the present invention and the purview of the appended claims.

DESCRIPTION OF THE PREFERRED EMBODIMENT

Figure 1:
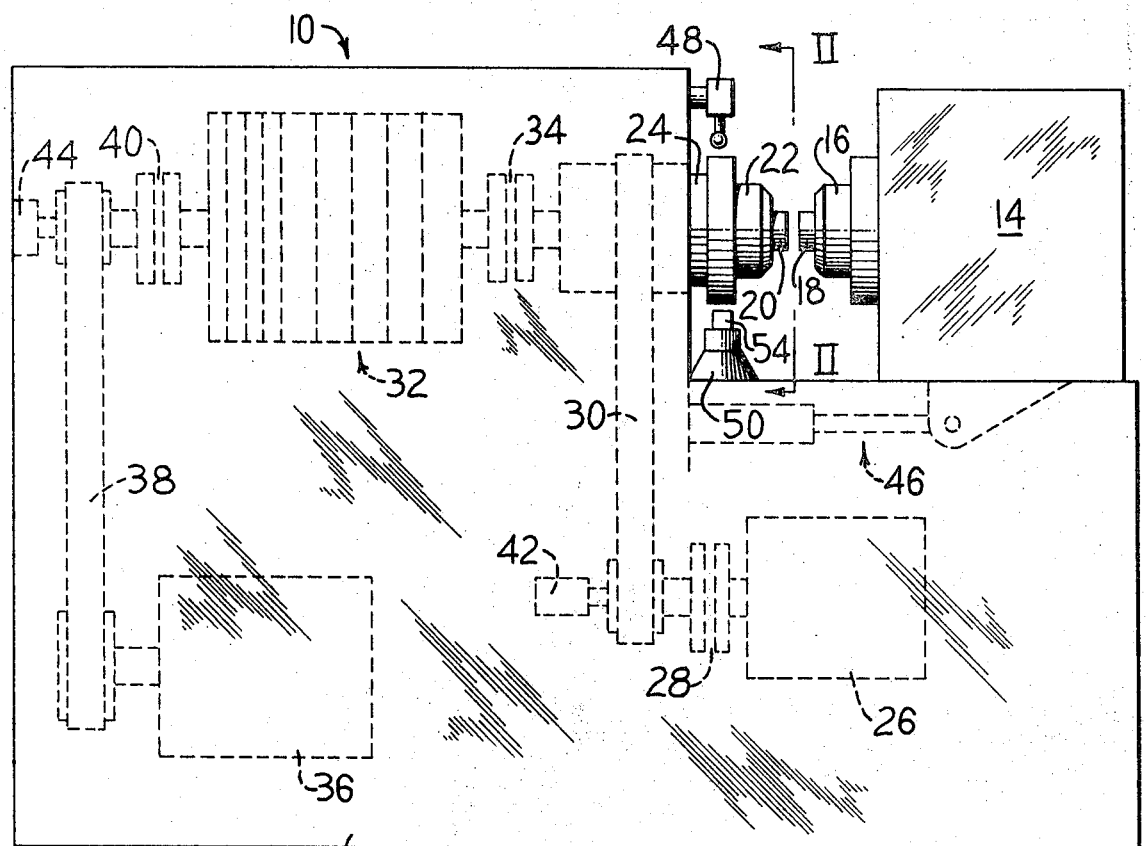
FIG. 1 is a side elevational view illustrating one embodiment of a friction welding machine which may be used to practice the present invention.

A friction welding machine constructed in accordance with one exemplary embodiment of the present invention is indicated generally by the reference numeral 10 in FIG. 1. The welding machine 10 comprises a frame or base 12 for housing the machine components and is provided with a movable tailstock assembly 14 upon which a non-rotatable chuck 16 is mounted.

Securely held inside chuck 16 is a workpiece or weld member 18 which is to be welded to a rotatable workpiece 20. The workpiece 20 is securely held in a rotatable chuck 22 which is positioned on one end of a rotatable spindle 24. The rotatable spindle 24 is rotated by means of a high speed motor 26, a clutch assembly 28 and a drive belt 30. The spindle 24 may also be selectively coupled to a rotatable mass, such as flywheel assembly 32, by means of a second clutch assembly 34. The purpose of connecting the flywheel assembly 32 to the spindle 24 will be explained at a later point in the description.

The flywheel assembly 32 is rotatable by a constant speed motor 36, a drive belt 38 and a clutch assembly 40. A speed indicator device 42 registers the speed of the spindle 24 and a separate speed indicator device 44 records the speed of the flywheel assembly 32. A pressure application assembly, such as a ram mechanism 46, is provided for moving the tailstock assembly 14 to supply heating and welding pressures during a welding cycle.

Figure 2:
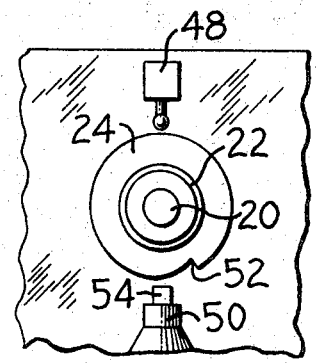
FIG. 2 is a sectional view taken on the line II—II of FIG. 1.

FIG. 2 illustrates a section of the welding machine in the area of the spindle 24 and depicts the manner in which a spindle sensing device 48 is mounted for sensing the exact position of the spindle 24. FIG. 2 also illustrates a spindle stop device 50 which, when activated engages a spindle stop 52 by means of an extendible stop pin 54. The precise details of the operation of the spindle sensing device 48 and the spindle stop device 50 will be more fully explained at a later point in the description.

The welding machine 10 may be operated in the following manner in order to join two weld pieces which require precise angular alignment with respect to each other. The workpiece 20 is first inserted into the rotatable chuck assembly 22 and firmly fastened therein with special attention directed to the orientation of the workpiece 20 with respect to the spindle stop 52 formed on the spindle 24. The workpiece 18 is then inserted into stationary chuck 16 and oriented to a precise position with respect to the workpiece 20 and therefore with respect to the spindle stop 52.

The high speed motor 26 is then activated and clutch 28 is engaged to cause the spindle 24 to be rotated at a high speed. After attaining a predetermined high speed the pressure assembly 46 is activated to advance the tailstock assembly 14 toward the rotating weld member 20 until contact is made between rotating weld member and the non-rotating weld member 18. The pressure assembly 46 applies a predetermined constant heating pressure to the interface of the welding workpieces 18 and 20 such that friction between the workpieces produces heat at the interface and raises the interface to a welding temperature.

After the interface between the workpieces has reached the welding temperature, clutch 28 is disengaged and the high speed motor 26 is shut down. After the clutch 28 has been disengaged the spindle 24 will begin to decelerate. At this point in the operation the pressure applied to the weld workpieces by the pressure assembly 46 may in some instances be relaxed somewhat but enough pressure is maintained on the weld pieces 18 and 20 to insure that they remain at the welding temperature.

During the time that the high speed motor 26 is driving the spindle 24 in order to heat the workpieces the motor 36 is activated and the clutch 40 is engaged to cause rotation of the flywheel assembly 32. The clutch 34, however, is not engaged and therefore there is no connection between the rotating flywheel assembly 32 and the spindle 24. The motor 36 will rotate the flywheel assembly at a low constant speed in an approximate range, for example, of 50–400 r.p.m. When the spindle 24 has decelerated to a predetermined speed (slightly higher than the speed of the flywheel assembly 32), as determined by the speed recording device 42, clutch 34 is engaged thereby connecting the flywheel assembly 32 to the spindle 24.

At this time the clutch assembly 40 will normally be disengaged and the flywheel assembly 32 and spindle 24 will decelerate as a unit. It is the function of the flywheel assembly 32 to insure the needed force or torque to rotate the spindle 24 to the proper position to provide the angular alignment between the workpieces 18 and 20. In some instances the workpieces 18 and 20 may be so small as to not require the application of the high torque flywheel assembly 32. However, in most instances, this large torque force is necessary since the weld pieces 18 and 20 are heated to the welding temperature and are therefore in condition for welding and a large force is necessary to turn the spindle when the workpieces are in this condition.

After the flywheel assembly 32 and spindle 34 have decelerated to a predetermined value as determined by the speed recording device 42 the spindle position sensing device 48 is actuated. The spindle position sensing device 48 senses the position of the spindle 24 by reading the position of the spindle stop 52. After the position sensing device 48 has determined the position of the spindle stop 52 it signals the clutch 34 to disengage and also signals the spindle stop assembly 50 to activate and advance the spindle stop pin 54. Thus, as the slowly rotating spindle 24 turns, the stop pin 54 will engage the spindle stop 52 and the spindle will be stopped at a precise position.

At the same time that the clutch 34 is disengaged and spindle stop assembly 50 is activated, it may be desirable to apply forging pressure to the weld members 20 and 18 by means of the pressure assembly 46.

Since the spindle was stopped at an exact predetermined position and the weld pieces were originally clamped in the machine in relation to this position, the weld pieces will be oriented in precise angular alignment with respect to each other. The weld is now completed, the chucks can be loosened, the weld pressure released, and the welded assembly removed from the welding machine. The operation may now be repeated by inserting two new workpieces into the rotating and non-rotating chucks.

It should be understood that other means such as a high torque motor could be substituted for the constant speed motor 36 and the flywheel assembly 32 to perform the function of providing the high torque force necessary to turn the spindle to the proper position for angular alignment.

Other means could also be used in place of the stop assembly 50 in order to bring the slowly rotating spindle to a stop at the exact location necessary for angular alignment between the workpieces. Thus, a suitable braking mechanism could be used or a combination of a stop pin assembly and a braking mechanism could be used to accomplish the function of stopping the slowly rotating spindle at a precise location. Although the operation of the machine depicted in FIG. 1 is normally such that the clutch assembly 40 is disengaged during the final positioning cycle, it is possible to operate the machine in a manner such that the clutch 40 remains engaged and the motor 36 continues to power the flywheel assembly and spindle until such time as the clutch 34 disengages.

Figure 3:
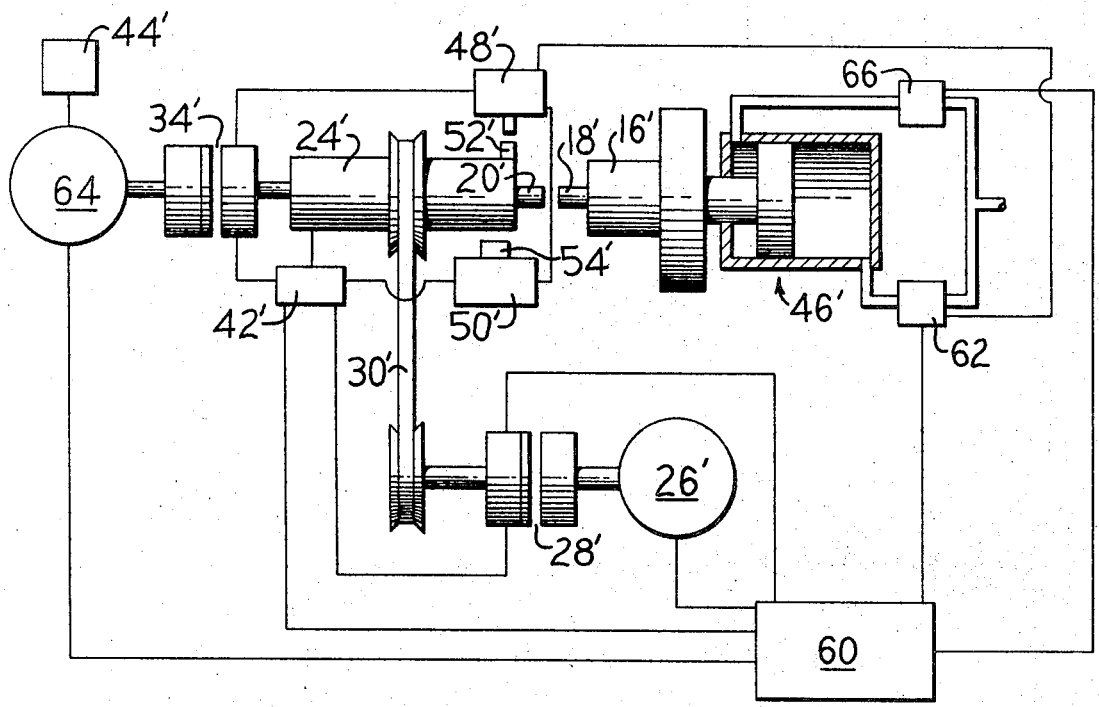
FIG. 3 is a schematic illustration of a modified embodiment which may be used to practice the present invention.

FIG. 3 is a schematic illustration of a modified embodiment of the invention in which components corresponding to similar components previously described with respect to FIGS. 1 and 2 are designated by the same number with a prime (') symbol.

Assuming that the weld pieces 18' and 20' have already been clamped and oriented in their respective chucks, the welding cycle, including final angular alignment of the workpieces proceeds as follows. A signal is sent from the central control unit 60 to the clutch assembly 28' to engage the high speed motor 26' with the drive means 30'. The high speed motor 26' is then activated by the control 60 which results in rotation of the spindle 24' through means of the clutch assembly 28' and drive means 30'.

A valve 62 is then signaled to open by the control 60 and a predetermined amount of pressure is allowed to enter the pressure chamber 46' to move the non-rotatable weld piece 18" into contact with the rotating weld piece 20'. Heat produced by the friction between the two weld pieces will bring the workpieces to a welding temperature in a relatively short period of time.

After the welding temperature has been attained, a timer in the control 60 signals clutch 28' to disengage and the motor 26' is disconnected. During the above described sequence, high torque motor 64 has been activated by control 60 to rotate at a low constant r.p.m., and the speed of the high torque motor 64 is monitored by the sensing device 44'.

After the clutch assembly 28' has been disengaged, the rotating spindle 24' will begin to decelerate. A small amount of pressure is maintained between the weld members 18' and 20' to keep the interface at the welding temperature. During this phase of the operation, the exact speed of the spindle 24' is being monitored by the speed indicating device 42'.

The spindle position sensing device 48' is then activated and monitors the exact position of the spindle 24'. At a predetermined and preset low speed of the spindle 24', the speed sensing device 42' signals the clutch 34' to engage thereby connecting the high torque motor 64 to the rotating spindle 24'. At approximately the same time, the position sensing device 48' signals the spindle stop assembly 50' to extend the stop pin 54'. The high torque motor 64 turns the spindle 24' through the last revolution to bring the spindle stop 52' into engagement with the positive stop pin 54'.

Just prior to actual engagement of the spindle stop 52' with the stop pin 54', the position sensing device 48' signals the clutch 34' to disengage, thereby disconnecting the spindle 24' from the high torque motor 64. At approximately the same time, the position sensing device 48' signals valve 62 so that a large volume of fluid is released into the pressure assembly 46' and a high thrust pressure is applied to the weld pieces 20' and 18'. Rotation of the spindle 24' completely stops as the spindle stop 52' comes into contact with stop pin 54'.

The weld is now completed and the weld pieces 18' and 20' are joined together in precise angular alignment since they were originally oriented in relation to the spindle stop 52'. The holding device 16' is then loosened and control 60 signals valve 62 to close and signals valve 66 to open. Opening of the valve 66 transmits fluid under pressure to the opposite end of the pressure cylinder 46' and causes the whole tailstock assembly to return to its preweld position. The welded assembly can now be removed from the machine and two new weld pieces can be inserted for a new welding cycle.

The present invention has been shown and described with respect to welding a single fixed workpiece, such as 18 to a movable workpiece 20. However, it should be recognized that the spindle 24 could be modified to rotate two workpieces (or a single workpiece) protruding from each end of the spindle. By providing another tailstock assembly 14 at the other end of such a modified spindle a plurality of workpieces could be joined in angular alignment with respect to each other since the controlling elements, such as the spindle indicator, spindle stop, high torque mechanism, etc., would operate in the manner presently disclosed.

While I have illustrated and described preferred embodiments of my invention, it is to be understood that these are capable of variation and modification, and I therefore do not wish to be limited to the precise de-

What is claimed is:

1. A method of friction welding a first workpiece to a second workpiece wherein the joined workpieces are angularly aligned in a predetermined position with respect to each other, said method comprising:
placing a first workpiece in a rotatable workpiece holding device and orienting said first workpiece with respect to an indicator means associated with the rotatable holding device;
placing a second workpiece in a non-rotatable holding device and orienting the second workpiece with respect to said first workpiece;
rapidly rotating said workpieces relative to each other;
forcing the workpieces together to produce frictional heat at the common interface between the workpieces to raise the interface to welding temperature;
decelerating the relative rotating workpieces to a predetermined value;
detecting the position of said indicator means; and
actuating stop means in response to the position of said indicator means to stop said rotatable holding device in its original position.

2. A method as set forth in claim 1 and further comprising:
applying a high torque force to the relative rotating workpieces after they have been decelerated; and
disengaging said high torque force just prior to actuating said stop means.

3. A method as set forth in claim 2 wherein said high torque force is provided by means of a high torque motor which may be selectively engaged and disengaged from said rotatable workpiece holding means.

4. A method as set forth in claim 2 wherein said high torque force is provided by means of a motor which is engageable with a rotatable mass and wherein coupling means are provided for selectively coupling said rotatable mass to said rotatable workpiece holding means and for selectively uncoupling said rotating mass from said rotatable workpiece holding means.

5. A method as set forth in claim 2 and further comprising:
applying a high axial thrust pressure to said workpieces at or just after the high torque force has been disengaged.

6. A method as set forth in claim 2 wherein said initial relative rotation between said workpieces is provided by a separate motor means which is disengaged prior to application of said high torque force.

References Cited

UNITED STATES PATENTS

| | | | |
|---|---|---|---|
| 3,235,158 | 2/1966 | Hollander | 228—2 |
| 3,235,162 | 2/1966 | Hollander | 29—470.3 |
| 3,337,108 | 8/1967 | Taylor | 228—2 |
| 3,417,457 | 12/1968 | Burke et al. | 29—470.3 |
| 3,451,121 | 6/1969 | Yocum | 29—470.3 |
| 3,462,826 | 8/1969 | Farmer et al. | 29—470.3 |

JOHN F. CAMPBELL, Primary Examiner

R. J. CRAIG, Assistant Examiner

U.S. Cl. X.R.

156—73; 228—2